United States Patent

Kwak et al.

[11] Patent Number: 6,110,517
[45] Date of Patent: Aug. 29, 2000

[54] METHOD FOR REMOVING CHOLESTEROL FROM MILK AND CREAM

[75] Inventors: Hae Soo Kwak; Joung Jwa Ahn; Dong Kuk Lee, all of Seoul, Rep. of Korea

[73] Assignee: Se Jong University, Seoul, Rep. of Korea

[21] Appl. No.: 09/124,034

[22] Filed: Jul. 29, 1998

[30] Foreign Application Priority Data

Aug. 2, 1997 [KR] Rep. of Korea ........................ 97-37127
Aug. 2, 1997 [KR] Rep. of Korea ........................ 97-37128

[51] Int. Cl.[7] .............................. A23C 13/00; A23C 9/00
[52] U.S. Cl. ........................ 426/330.2; 426/491; 426/580; 426/586
[58] Field of Search ................................ 426/330.2, 330, 426/580, 586, 491

[56] References Cited

U.S. PATENT DOCUMENTS

| | | | |
|---|---|---|---|
| 5,232,725 | 8/1993 | Roderbourg | 426/422 |
| 5,264,226 | 11/1993 | Graille | 426/422 |
| 5,264,241 | 11/1993 | Graille | 426/422 |
| 5,468,511 | 11/1995 | Zeidler | 426/429 |
| 5,487,912 | 1/1996 | Meibach | 426/437 |
| 5,824,354 | 10/1998 | Ritter | 426/490 |

FOREIGN PATENT DOCUMENTS

| | | |
|---|---|---|
| 4168198 | 6/1992 | Japan . |
| WO 91/11114 | 8/1991 | WIPO . |
| WO 91/16824 | 11/1991 | WIPO . |
| WO-93/05084 | 3/1993 | WIPO . |

OTHER PUBLICATIONS

American Dairy Science Association and Northeast ADSA/ASAS Meeting—Jun. 13–16, 1993—JDS vol. 76 Supplement 1, J.S. Lee, Z. Ustunol and D.M. Smith—Michigan State University, E. Lansing.

*Primary Examiner*—Carolyn Paden

[57] ABSTRACT

There is disclosed a method for removing cholesterol from milk and cream at a high efficiency without deleteriously affecting the product quality. After homogenization, milk is added with $\beta$-cyclodextrin at an amount of 0.5–5% (w/v). The milk is stirred at 4–30° C. and at 200–2,000 rpm for 5–30 min, followed by centrifugation at 22–555×g for 5–30 min. Similarly, cream is added with $\beta$-cyclodextrin at an amount of 1–20% (w/v) and then, treated by stirring at 20–60° C. and at 400–4,000 rpm for 5–60 min and centrifuging at 222–444×g.

2 Claims, No Drawings

METHOD FOR REMOVING CHOLESTEROL FROM MILK AND CREAM

BACKGROUND OF THE INVENTION

1. Field of the Invention

The present invention relates, in general, to a method for removing cholesterol from milk and cream and, more particularly, to use of β-cyclodextrin in removing cholesterol from milk and cream.

2. Description of the Prior Art

Some milk products are high in cholesterol content. For instance, cholesterol is usually present at an amount of 219 mg per 100 ml in butter, 110 mg in cream cheese, and 105 mg in ice cream. Because these milk products are manufactured by using, as a base material, cream, which is rich in cholesterol (100 ml of cream with a fat content of 36% contains approximately 125 mg of cholesterol), the cream is a source of cholesterol for the milk products.

Milk contains a small amount of cholesterol (cholesterol as small as 13.14 mg is present in 100 g of the milk 3.6% in fat content). Thus, it is nutritionally beneficial for the average person to drink milk which normally contains cholesterol. However, cholesterol-free milk is needed for medical patients who must avoid the ingestion of cholesterol, for example, patients suffering from cardiac diseases, such as hypertension, arteriosclerosis, coronary arteriosclerosis, etc. Cholesterol-free milk is also used as a material for the production of cholesterol-free yogurt or cheese and is one of the most favorite foods to those who refuse to eat animal fat owing to the fear of adult diseases.

β-Cyclodextrin (hereinafter referred to as "β-CD"), a cyclic polysaccharide consisting of 7 glucose residues, is used to remove cholesterol. Because its central portion is a circular hydrophobic space similar in diameter to a cholesterol molecule, β-CD can well bind cholesterol, which is non-polar. Particularly, β-CD easily absorbs cholesterol at a temperature as low as or lower than 4° C., so that it is effective in keeping the quality of milk. In addition, β-CD can be easily separated by virtue of its low solubility. Further, it has the advantages of being inexpensive and safe to the human body and being permitted to be used as a food additive in many countries.

Japanese Pat. Laid-Open Pub. No. 04168198 relates to a removing method of cholesterol from cream, disclosing that 20 g of cream with a water content of 50% is added with 1.2 g of β-CD, stirred at 30° C. for 60 min, warmed and centrifuged to isolate a cream line. The maximal removal of cholesterol was allegedly 84.9%.

Another condition for removing cholesterol was suggested (J. of Dairy Science, Vol. 76, Supplement 1, Abst. No. D158). According to this, the treatment of cream with β-CD while stirring at 40° C. for 120 min is written to show a removal efficiency of 83% in maximum.

These conventional processes, however, may cause a degradation in the product quality because the stirring is carried out at too high temperatures as well as for too long times. Another problem of the conventional processes is that the maximal removal efficiency is low.

While approximately 80% of the cholesterol of milk is present in fat globules, the rest is in milk serum. Thus, in order to remove cholesterol from milk at a maximum, milk is needed to be homogenized before the removal.

Cholesterol removal from milk is disclosed in International Patent Laid-Open Pub. No. WO 93/05084. According to this patent, 10 ml of homogenized milk is added and mixed with 200 mg of β-CD or β-CD polymer at 15° C., stirred for 30 min and centrifuged at 4,000×g for 15 min at 4° C. to separate cream and milk. The supernatant cream is subjected to cholesterol assay. This technique may also cause degradation of the product quality owing to the same reasons as in above: too high temperature and too long time for the stirring. In addition, too much β-CD is used. The too fast centrifugation brings about the separation of cream line, deteriorating the product quality. This requires re-homogenization of the milk, resulting in a too long production procedure and an increase in production cost.

SUMMARY OF THE INVENTION

Through intensive and thorough research on the removal of cholesterol from milk and cream, the present inventors have found that the cholesterol constrained within fat membranes can be released at a great amount without degrading product quality by controlling the stirring speed and time.

Therefore, it is an object of the present invention to overcome the above problems encountered in prior arts and to provide a method for removing cholesterol from milk and cream as much as possible without causing any degradation in product quality.

DETAILED DESCRIPTION OF THE INVENTION

Homogenization of milk breaks down fat globules, releasing the cholesterol constrained therein. The released cholesterol comes in contact with the cholesterol-absorbers present outside the fat globules to form a complex which is readily isolated. Thus, it is important to afford an environment in which the contact area between the cholesterol molecules and the absorbers is increased as much as possible.

The present invention likewise employs β-CD and stirring as a cholesterol absorber and a homogenization means, respectively, but with a careful consideration to the time and speed for the stirring as well as centrifugation.

According to the present invention, milk is deprived of cholesterol as follows. Raw milk is homogenized at 175 kg/cm$^2$ (2,200 PSI), followed by the addition of β-CD at an amount of 0.5–2% of the raw milk. This milk is stirred at 4–20° C. and at 400–800 rpm for 5–20 min to form an insoluble complex of cholesterol and β-CD, which is isolated by centrifugation at 55–166×g for 15 min.

As for cream, it is added with β-CD at an amount of 5–15% while keeping the temperature at 30° C. Stirring the cream at 800–2,000 rpm for 10–30 min leads to the formation of an insoluble complex of cholesterol and β-CD, which is isolated by centrifugation at 222–444×g for 15 min.

A better understanding of the present invention may be obtained through the following examples which are set forth to illustrate, but are not to be construed as the limit of the present invention.

In the examples, the removal proportion of cholesterol from cream was measured by gas chromatography. For this, cholesterol was extracted, filtered and washed. The gas chromatography was performed using a column "HP-5" (crosslinked 5% PH Me silicon) whose film is 0.25 μm thick, 30 m long and 0.35 mm in diameter while the temperature of an oven was maintained at 190° C. for 2 min, then elevated at a speed of 20° C. per min to 230° C. which was maintained for 3 min, and finally cooled down to 225° C. at which 25 min is let to pass. Carrier gas for the gas chromatography was helium (2 ml/min), air (300 ml/min) and hydrogen (30 ml/min). Detection was performed with FID using as an internal standard cholestane (1 mg/ml).

EXAMPLE I

After being homogenized, milk with a fat content of 3.6% was added with β-CD at an amount of 0.5%, 1.0% and 2.0%

(w/v), respectively. The resulting milk was stirred at 800 rpm at 10° C. for 10 min, followed by the centrifugation at 111×g 10 min. The removal proportion of cholesterol was measured and the results are given as shown in Table 1, below.

TABLE 1

Effect of the amount of β-CD on the Removal of Cholesterol

| Addition Amounts of β-CD %(w/v) | Removal Proportion of Cholesterol (%) |
| --- | --- |
| 0.5 | 92.2 |
| 1.0 | 94.0 |
| 2.0 | 88.6 |

As shown in Table 1, the greatest amount of cholesterol was removed upon addition of β-CD at an amount of 1% (w/v).

EXAMPLE II

After homogenization, milk with a fat content of 3.6% was added with β-CD at an amount of 1% (w/v). The milk was stirred for 10 min at 800 rpm and at a temperature of 4° C., 10° C. and 20° C., respectively, followed by centrifugation at 111×g for 10 min. Measurement was made for the removal proportion of cholesterol and the results are given as shown in Table 2, below.

TABLE 2

Effect of the Stirring Temp. on the Removal of Cholesterol

| Stirring Temp. (° C.) | Removal Proportion of Cholesterol (%) |
| --- | --- |
| 4 | 93.7 |
| 10 | 94.6 |
| 20 | 93.5 |

The data show that the stirring at 10° C. results in the highest removal proportion, but it is not considerably different from those obtained at 4° C. and 20° C.

EXAMPLE III

After being homogenized, milk with a fat content of 3.6% was added with β-CD at an amount of 1% (w/v). The milk was stirred at 10° C. and at 800 rpm for a time of 5 min, 10 min, and 20 min, respectively, followed by centrifugation at 111×g for 10 min. Measurement was made for the removal proportion of cholesterol and the results are given as shown in Table 3, below.

TABLE 3

Effect of the Stirring Time on the Removal of Cholesterol

| Stirring Time (min) | Removal Proportion of Cholesterol (%) |
| --- | --- |
| 5 | 93.2 |
| 10 | 93.9 |
| 20 | 92.5 |

The data show that the stirring for 10 min results in the highest removal proportion, but it is not considerably different from those obtained for 5 and 10 min.

EXAMPLE IV

After being homogenized, milk 3.6% in fat content was added with β-CD at an amount of 1% (w/v). The milk was stirred for 10 min at 10° C. and at 400 rpm and 800 rpm, respectively, followed by centrifugation at 111×g for 10 min. Measurement was made for the removal proportion of cholesterol and the results are given as shown in Table 4, below.

TABLE 4

Effect of the Stirring Speed on the Removal of Cholesterol

| Stirring Speed (rpm) | Removal Proportion of Cholesterol (%) |
| --- | --- |
| 400 | 94.2 |
| 800 | 94.4 |

As shown, the two stirring speeds bring about similar results.

EXAMPLE V

After being homogenized, milk 3.6% in fat content was added with β-CD at an amount of 1% (w/v). The milk was stirred for 10 min at 10° C. and at 800 rpm, followed by centrifugation for 10 min at 55×g, 111×g and 155×g, respectively. Measurement was made for the removal proportion of cholesterol and the results are given as shown in Table 5, below.

TABLE 5

Effect of the Centrifuging Speed on the Removal of Cholesterol

| Centrifuging Speed (xg) | Removal Proportion of Cholesterol (%) |
| --- | --- |
| 55 | 86.7 |
| 111 | 94.9 |
| 166 | 95.9 |

As shown in Table 5, the greatest amount of cholesterol is removed at a centrifugation speed of 1,500 rpm, but is not considerably different from that removed at 1,000 rpm.

EXAMPLE VI

After being homogenized, milk 3.6% in fat content was added with β-CD at an amount of 1% (w/v). The milk was stirred for 10 min at 10° C. and at 800 rpm, followed by centrifugation at 111×g for 5 min, 10 min and 15 min, respectively. Measurement was made for the removal proportion of cholesterol and the results are given as shown in Table 6, below.

TABLE 6

Effect Of the Centrifuging Time on the Removal Of Cholesterol

| Centrifuging Time (° C.) | Removal Proportion of Cholesterol (%) |
| --- | --- |
| 5 | 91.9 |
| 10 | 94.6 |
| 15 | 94.1 |

As shown in Table 6, the greatest amount of cholesterol is removed upon centrifugation for 10 min, but is similar to that removed upon centrifugation for 15 min.

EXAMPLE VII

After being homogenized, cream with a fat content of 36% was added with β-CD at an amount of 10% (w/v). The cream was stirred at 10 min, 20 min and 30 min while varying the stirring speed into 800 rpm, 1,200 rpm and 1,600 rpm. Measurement was made for the removal proportion of cholesterol and the results are given as shown in Table 7, below.

TABLE 7

Effect of the Stirring Time and Speed on the Removal of Cholesterol

| Stirring Time | Stirring Speed (rpm) | | |
|---|---|---|---|
| (min) | 800 | 1,200 | 1,600 |
| 10 | 85.7 | 88.8 | 88.3 |
| 20 | 89.7 | 92.8 | 92.3 |
| 30 | 91.1 | 94.2 | 93.7 |

The data show that the stirring speed 1,200 rpm allows more cholesterol to be removed than at the other speeds and that the longer the stirring time is, the more the cholesterol is removed.

EXAMPLE VIII

After being homogenized, cream 36% in fat content was added with β-CD at an amount of 5%, 10% and 15% (w/v), respectively. Each of the resulting cream was stirred for 10 min at a speed of 800 rpm, 1,200 rpm and 1,600 rpm. Measurement was made for the removal proportion of cholesterol and the results are given as shown in Table 8, below.

TABLE 8

Effect of the Stirring Speed and the Addition Amount of β-CD on the Removal of Cholesterol

| β-CD | Stirring Speed (rpm) | | |
|---|---|---|---|
| %(w/v) | 800 | 1,200 | 1,600 |
| 5 | 77.2 | 80.8 | 83.8 |
| 10 | 85.9 | 87.4 | 88.8 |
| 15 | 94.1 | 94.0 | 93.8 |

The data of Table 8 show that, when the stirring is performed for 10 min, cholesterol is most removed by adding β-CD at an amount of 15% (w/v), irrespectively of the stirring speed.

EXAMPLE IX

After being homogenized, cream 36% in fat content was added with β-CD at an amount of 5%, 10% and 15% (w/v), respectively. Each of the resulting creams was stirred for 20 min at a speed of 800 rpm, 1,200 rpm and 1,600 rpm. Measurement was made for the removal proportion of cholesterol and the results are given as shown in Table 9, below.

TABLE 9

Effect of the Stirring Speed and the Addition Amount of β-CD on the Removal of Cholesterol

| β-CD | Stirring Speed (rpm) | | |
|---|---|---|---|
| %(w/v) | 800 | 1,200 | 1,600 |
| 5 | 65.1 | 66.4 | 68.2 |
| 10 | 90.6 | 91.9 | 93.7 |
| 15 | 97.6 | 98.5 | 99.2 |

The data of Table 9 show that, when the stirring is performed for 20 min, more cholesterol is removed as the stirring speed is faster and the addition amount of β-CD is greater. In this example, 99.2% removal of cholesterol from cream was obtained when adding β-CD at an amount of 15% (w/v) and stirring at 1,600 rpm.

EXAMPLE X

After being homogenized, cream 36% in fat content was added with β-CD at an amount of 5%, 10% and 15% (w/v), respectively. Each of the resulting cream was stirred at 1,200 rpm for a time of 10 min, 20 min and 30 min. Measurement was made for the removal proportion of cholesterol and the results are given as shown in Table 10, below.

TABLE 10

Effect of the Stirring Time and the Addition Amount of β-CD on the Removal of Cholesterol

| β-CD | Stirring Time (min) | | |
|---|---|---|---|
| %(w/v) | 10 | 20 | 30 |
| 5 | 64.7 | 66.8 | 69.3 |
| 10 | 90.2 | 92.3 | 94.8 |
| 15 | 98.1 | 98.9 | 99.1 |

The data of Table 10 show that more cholesterol is removed as the stirring time is longer and the addition amount of β-CD is greater. In this example, 99.1% removal of cholesterol from cream was obtained when adding β-CD at an amount of 15% (w/v) and stirring for 30 min.

EXAMPLE XI

After being homogenized, cream 36% in fat content was added with β-CD at an amount of 5%, 10% and 15% (w/v), respectively. Each of the resulting creams was stirred at 3,000 rpm for a time of 10 min, 20 min and 30 min. Measurement was made for the removal proportion of cholesterol and the results are given as shown in Table 11, below.

TABLE 11

Effect of the Stirring Time and the Addition Amount of β-CD on the Removal of Cholesterol

| β-CD | Stirring Time (min) | | |
|---|---|---|---|
| %(w/v) | 10 | 20 | 30 |
| 5 | 62.9 | 65.8 | 68.8 |
| 10 | 88.0 | 84.5 | 94.0 |
| 15 | 96.3 | 98.3 | 99.3 |

Similar to those obtained in Example X, the data of Table 11 exhibit that more cholesterol is removed as the stirring time is longer and the addition amount of β-CD is greater. In this example, 99.3% removal of cholesterol from cream was obtained when adding β-CD at an amount of 15% (w/v) and stirring for 30 min.

EXAMPLE XII

After being homogenized, cream 36% in fat content was completely deprived of cholesterol by adding β-CD at an amount of 15% (w/v), stirring at 1,200 rpm for 20 min and centrifuging. This cholesterol-free cream was mixed and homogenized with skim milk, to give milk which was free of cholesterol.

EXAMPLE XIII

After being homogenized, cream 36% in fat content was deprived of cholesterol by adding β-CD at an amount of 20%(w/v), stirring for 60 min at 60° C. and at 444×g and centrifuging. This cholesterol-deprived cream was mixed and homogenized with skim milk to give milk which contained cholesterol at an amount of 0.5% or less.

As described hereinbefore, the method according to the present invention enables cholesterol to be removed from milk and cream at such a low temperature as not to deleteriously affect the product quality by optimally adjusting the addition amount of β-CD, the reaction temperature, the stirring time and speed, and the centrifugation time and speed. Cholesterol-deprived or -free milk or cream can be used to prepare low cholesterol or cholesterol-free yogurt, cheese, ice cream, whipping cream, butter, etc. These foods are very helpful for the health of medical patients who must avoid the ingestion of cholesterol, for example, patients suffering from cardiac diseases, such as hypertension, arteriosclerosis, coronary arteriosclerosis, etc.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for removing cholesterol from milk, which consists essentially of the steps of homogenizing the milk, adding β-cyclodextrin in an amount of approximately 0.5–2% (w/v) to the milk, to form a complex in which the cholesterol of the milk is associated with the β-cyclodextrin, stirring the milk at 4–20° C. and at 400–800 rpm for 5–20 min., and centrifuging the milk at 55–166×g for 5–15 min. to isolate the complex.

2. A method for removing cholesterol from cream which consists essentially of the steps of homogenizing the cream, adding β-cyclodextrin in an amount of approximately 5–15% (w/v) to the cream, stirring the cream at 30° C. and at 800–2000 rpm for 10–30 min, and centrifuging the cream at 222–444×g for 15 min.

* * * * *